(12) United States Patent
Stadler

(10) Patent No.: US 11,878,623 B2
(45) Date of Patent: Jan. 23, 2024

(54) ILLUMINATION DEVICE FOR MOTOR VEHICLE HEADLIGHT OR MOTOR VEHICLE

(71) Applicant: ZKW Group GmbH, Wieselburg (AT)

(72) Inventor: Manuel Stadler, Hofamt Priel (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/205,659

(22) Filed: Jun. 5, 2023

(65) Prior Publication Data

US 2023/0391249 A1    Dec. 7, 2023

(30) Foreign Application Priority Data

Jun. 7, 2022   (EP) ..................................... 22177610

(51) Int. Cl.
| | | |
|---|---|---|
| *B60Q 1/076* | (2006.01) | |
| *F21S 41/63* | (2018.01) | |
| *F21S 41/20* | (2018.01) | |
| *F21S 41/153* | (2018.01) | |
| *F21Y 105/16* | (2016.01) | |
| *F21Y 115/10* | (2016.01) | |
| *F21Y 105/12* | (2016.01) | |

(52) U.S. Cl.
 CPC ............ *B60Q 1/076* (2013.01); *F21S 41/153* (2018.01); *F21S 41/285* (2018.01); *F21S 41/635* (2018.01); *F21Y 2105/12* (2016.08); *F21Y 2105/16* (2016.08); *F21Y 2115/10* (2016.08)

(58) Field of Classification Search
 CPC ........ F21V 14/06; F21S 41/635; B60Q 1/076; B60Q 1/0683
 See application file for complete search history.

(56) References Cited

U.S. PATENT DOCUMENTS

| 10,655,813 B2 | 5/2020 | Zhou et al. |
|---|---|---|
| 2006/0039160 A1 | 2/2006 | Cassarly et al. |

(Continued)

FOREIGN PATENT DOCUMENTS

KR    20190125750 A    11/2019

OTHER PUBLICATIONS

Extended European Search Report Issued in EP Application No. 22177610.7, dated Nov. 28, 2022 (5 Pages).

*Primary Examiner* — Eric T Eide
(74) *Attorney, Agent, or Firm* — Eversheds Sutherland (US) LLP

(57) ABSTRACT

Illumination device, for a motor vehicle headlight, has an illuminant and an optical device associated therewith. The optical device has adjustment means to adjust operating states (OS) of the optical device. In a first OS, the optical device forms a first light function with light of the illuminant. In a second OS, the optical device forms a second light function different from the first light function with light of the illuminant. The illuminant includes light sources spaced apart from one another, and the optical device has scattering elements to scatter the light of the light sources. The adjustment means is configured to adjust the optical device such that in the first OS, the optical device has a first normal distance to the light sources and, in the second OS, has a second normal distance to the light sources, wherein the second normal distance is greater than the first normal distance.

20 Claims, 1 Drawing Sheet

(56) References Cited

U.S. PATENT DOCUMENTS

| | | | | |
|---|---|---|---|---|
| 2007/0133970 A1* | 6/2007 | Honjo | ............... | G03B 3/10 |
| | | | | 396/97 |
| 2022/0299182 A1 | 9/2022 | Kemetmuller et al. | | |
| 2022/0328739 A1* | 10/2022 | Yoshida | ............ | F21S 41/657 |
| 2022/0397254 A1* | 12/2022 | Oshima | ............ | F21S 41/285 |

* cited by examiner

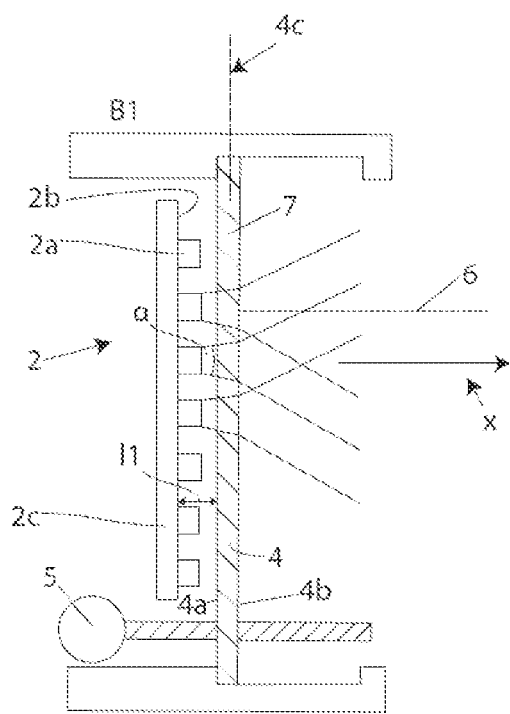
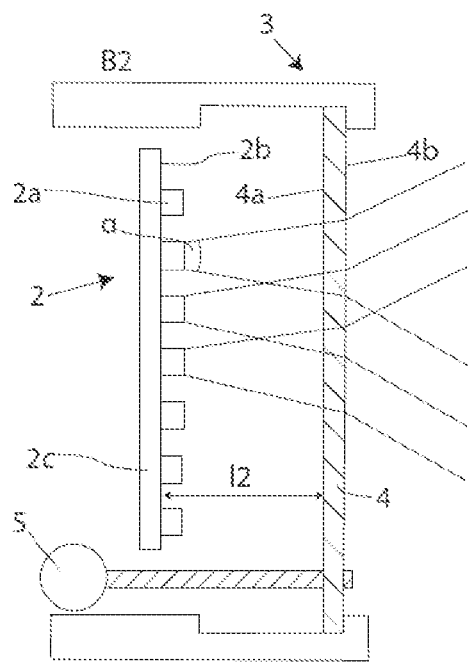
Fig. 1
Fig. 2
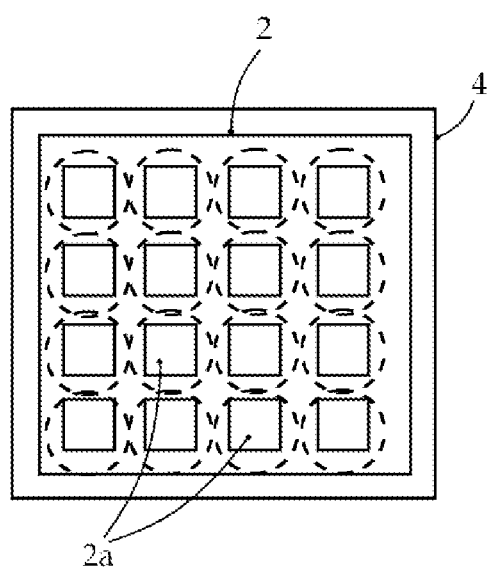
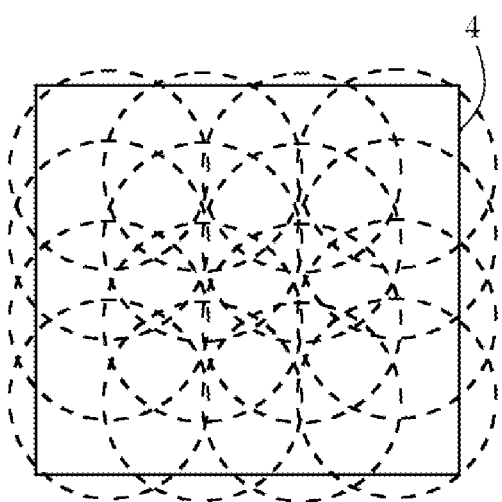
Fig. 1a
Fig. 2a

ILLUMINATION DEVICE FOR MOTOR VEHICLE HEADLIGHT OR MOTOR VEHICLE

CROSS-REFERENCE TO RELATED APPLICATIONS

This application claims priority to European Patent Application No. 22177610.7, filed Jun. 7, 2022, which is incorporated herein by reference.

FIELD OF THE INVENTION AND DESCRIPTION OF PRIOR ART

The invention relates to an illumination device for a motor vehicle headlight or a motor vehicle, wherein the illumination device has an illuminant and an optical device associated with the illuminant, wherein the illuminant is configured to generate light and emit the generated light onto the optical device, and the optical device is configured to perform at least two different light functions from the light of the illuminant,
  wherein the optical device has an optically active region, which has an optical axis and a main plane, wherein the optically active region has a light entry surface and a light emitting surface opposite the light entry surface, wherein light emitted by the illuminant enters the optically active region of the optical device via the light entry surface, passes through the optically active region of the optical device and exits the optically active region of the optical device via the light emitting surface, wherein the optical device has an adjustment means, which is configured to adjust operating states of the optical device, wherein at least two different operating states of the optical device are provided,
  wherein in a first operating state, the optical device forms a first light function with the light of the illuminant as it passes through the optically active region, and in a second operating state, the optical device forms a second light function with the light of the illuminant as it passes through the optically active region.

The invention further relates to a motor vehicle headlight with an illumination device.

Illumination devices for motor vehicle headlights are known in the prior art. It is also known that several light functions can be performed with such illumination devices.

Disadvantageously, such illumination devices usually comprise numerous lighting components, such as differently configured projection lenses and light sources, usually different ones, assigned to them in order to be able to produce several light functions.

SUMMARY OF THE INVENTION

The object of the present invention consists in mitigating or eliminating the disadvantages of the prior art. The objective of the invention is therefore in particular to create an illumination device that can perform several light functions and has a structure that is as simple as possible or has as few parts as possible.

This object is achieved by an illumination device having the features of claim 1. Preferred embodiments are specified in the dependent claims.

According to the invention, the illuminant comprises a plurality of light sources spaced apart from one another at a minimum distance, which are arranged in a light source surface, preferably uniformly, distributed on a light source support of the illuminant, wherein each light source emits a divergent light beam with an opening angle, which spreads along a main emission direction, wherein each light beam forms a luminous spot on the optically active region of the optical device,
  wherein the optically active region of the optical device has scattering elements, which are configured to scatter the light of the light sources around the main emission direction when passing through the optically active region,
  wherein the adjustment means is configured to adjust the optical device in such a way that in the first operating state, the optically active region of the optical device has a first normal distance to the light source surface and, in the second operating state, the optically active region of the optical device has a second normal distance to the light source surface, wherein the first normal distance is such that luminous spots of light beams from two adjacent light sources are overlap-free on the optically active region, wherein the second normal distance is greater than the first normal distance such that luminous spots of light beams from two adjacent light sources at least partially overlap on the optically active region.

The overlap of the luminous spots or light beams in the second operating state results in the advantage that the light of the individual light sources or light beams overlaps to form an overall light image (or overall light beam), which defines the second light function, wherein advantageously in the first operating state, the first light function is defined by the individual light beams of the light sources due to the overlap-free light beams. Different light functions can therefore be produced depending on the normal distance between the optical device (or its optically active region) and the light sources of the illuminant. In particular, the optically active region of the optical device can be configured for diffuse scattering, wherein a substantially (for an observer) blurred or diffusely scattered overall light image can be produced on the light emitting surface of the optically active region as a result of the second normal distance between the optically active region of the optical device and the light sources, which is increased in the second operating state, and the overlap of the light beams that can be produced as a result as well as the scattering of the light beams when passing through the optically active region. By contrast, in the first operating state, the first normal distance is so small (or reduced to such an extent compared to the second normal distance) that there can be no overlap of the light beams before they strike the optically active region, whereby the scattering effect of the optically active region has no optically significant effect on the light beams. In the first operating state, there can thus also be diffuse scattering of the light beams as they pass through the optically active region, but the first light function is formed by the individual light beams or the individual light sources and not, as in the second operating state, by the overlap of the light beams. As a result of the overlapping of the light beams, the second light function is substantially blurred to an observer or an observer can no longer recognize the positions of the individual light sources in the second light function. This has the effect that the observer of the optical device can recognize or perceive a homogeneously illuminated optically active region in the second operating state. In contrast, in the first operating state, the normal distance between the light sources and the optical device or the optically active region of the optical device is smaller than in the second operating state, whereby the light beams (or light cones) from adjacent light sources do not overlap before passing through the optically active region. Due to the fact that the light from adjacent light sources does not mix along the main emission direction of the light (or the light beams do not overlap), an observer can perceive or recognize the individual positions of the light sources. The first light function is therefore composed of the individual illuminating light sources, wherein each light source is recognizable. During a transition from the first operating state to the second operating state, the adjustment means 5 can displace the optically active region 4 substantially along the optical axis of the optically active region 4, in particular in a linear direction.

It can be provided that the overlap of the luminous spots of adjacent light beams in the second operating state is at least 25%, preferably more than 50%, in particular more than 75%. The larger the overlap of adjacent light beams, the more homogeneous the second light function can be or the more uniformly the optically active region can light up in the second operating state.

It can be provided that the main emission direction is oriented substantially parallel to the optical axis of the optically active region. The main emission directions of all light sources are preferably parallel to the optical axis of the optically active region.

It can be provided that the optically active region of the optical device is flat, wherein the optical axis of the optically active region is oriented orthogonally to the main plane of the optically active region. The optically active region of the optical device can be configured as a film element. The optically active region can in particular be configured as a flat, optically active diffuser film, which is configured to scatter light, preferably diffusely, when it passes through the diffuser film. The optical device can be arranged relative to the illuminant in such a way that the optically active region of the optical device is oriented substantially parallel to the light source surface of the illuminant.

It can be provided that the scattering elements comprise a plurality of diffuser lenses arranged side by side in a, preferably uniform, grid, a plurality of scattering surface structures, or a plurality of scattering particles arranged within the optically active region. In particular, the scattering elements are configured to scatter, preferably diffusely, the light of the light sources when it passes through the optically active region.

It can be provided that the transition from the first normal distance to the second normal distance between the main plane of the optically active region of the optical device and the light source surface of the light sources can be substantially continuously adjusted with the adjustment means. For this purpose, the adjustment means can, for example, comprise an electrically controllable linear drive element.

It can be provided that the adjustment means is configured to adjust a third operating state of the optical device that is different from the first and second operating state, wherein the adjustment means carries out a displacement and/or pivotal movement of the optical device relative to the light sources of the illuminant during the transition to the third operating state, wherein during the displacement and/or pivotal movement, the optical device is displaced and/or pivoted in such a way that in the third operating state, the optically active region of the optical device lies outside of a beam path of the light of the illuminant such that in the third operating state, the optically active region is unlit. This has the advantage that in the third operating state, a third light function can be performed, which, like the first light function, can be formed merely by the light sources, without an additional optical effect of the optical device, wherein as a result of the fact that the optically active region of the optical device remains unlit, it is exposed to reduced heat influence, which in turn can increase the service life of the optical device.

It can be provided that the illumination device comprises a light source control device, which is configured to individually control the light sources of the illuminant, wherein the light sources are preferably LEDs. This has the advantage that a large number of different light functions can be performed.

It can be provided that the light sources are arranged in the light source surface distributed on the light source support in a grid, wherein the light sources are in particular arranged along rows and columns of a two-dimensional, preferably uniform, grid. In particular, the light sources can be distributed on the light source surface according to a light source surface density, wherein the light source surface density is defined as the number of light sources per light source surface. The light source surface density can be consistent over the entire light source surface. Regions of the light source surface can also have different light source surface densities, which in turn can increase the number of possible light functions (or light patterns that can be produced by means of illuminating light sources).

It can be provided that the light source support is flat, wherein the light source surface, which is in particular flat, is preferably oriented substantially parallel to the light source support. As a result, the illumination device can be configured to be particularly compact.

It can be provided that the light sources of the illuminant are formed from at least two light source groups, wherein light sources of a first light source group are arranged in the light source surface on the light source support in a first, preferably uniform, grid with a first grid spacing from one another, wherein light sources of a second light source group are arranged in the light source surface on the light source support in a second, preferably uniform, grid with a second grid spacing from one another, wherein the first grid spacing is greater than the second grid spacing. Alternatively, the first light source group can have a first light source surface density and the second light source group can have a second light source surface density, wherein the first light source surface density and the second light source surface density are different. This can further increase the number of possible light functions.

It can be provided that the optically active region of the optical device is formed from at least two optically active partial regions, wherein a first optically active partial region has a first number of scattering elements and a second optically active partial region has a second number of scattering elements, wherein the first and second number of scattering elements are different. This can further increase the number of possible light functions.

It can be provided that the illuminant is arranged relative to the optical device in such a way that light of the first light source group strikes the first optically active partial region and light of the second light source group strikes the second optically active partial region. This can increase the number of possible light functions even further.

It can be provided that the first light function is an information transfer light function, by means of which a definable, predeterminable symbol, which is made up of individual illuminating light sources, can be displayed, wherein the second light function is preferably a brake light, a direction indicator light function, a daytime running light, a position light or a stop light.

The invention can comprise a motor vehicle headlight with an illumination device according to the invention.

In the context of this description, the terms "above", "below", "horizontal", "vertical" should be understood as indications of orientation when the illumination device is arranged in its normal position of use after having been fitted to a motor vehicle headlight or to a motor vehicle.

BRIEF DESCRIPTION OF THE DRAWINGS

The invention is outlined in more detail below based on a preferred exemplary embodiment, to which it is, however, not limited: In the drawings:

FIG. 1 shows a side view of an illumination device according to the invention in a first operating state;

FIG. 1a shows a front view of the illumination device according to FIG. 1;

FIG. 2 shows a side view of the illumination device according to FIG. 1 in a second operating state; and FIG. 2a shows a front view of the illumination device according to FIG. 2.

The figures are schematic and highly simplified with components that are not essential to the invention not being shown. In particular, the number of light sources 2a of the illuminant 2 is greatly reduced in FIGS. 1 and 2 compared to FIGS. 1a and 2a for a better overview.

DETAILED DESCRIPTION OF EMBODIMENTS OF THE INVENTION

FIG. 1 shows an illumination device 1 according to the invention for a motor vehicle headlight or a motor vehicle. The illumination device 1 comprises an illuminant 2 and an optical device 3 associated with the illuminant 2. The illuminant 2 is configured to generate light and emit the generated light onto the optical device 3. The optical device 3 is configured to perform at least two different light functions from the light of the illuminant 2. The optical device 3 has an optically active region 4, which has an optical axis x and a main plane 4c. The optically active region 4 comprises a light entry surface 4a and a light emitting surface 4b opposite the light entry surface 4a. The optically active region 4 of the optical device 3 is flat, wherein the optical axis x of the optically active region 4 is oriented orthogonally to the main plane 4c of the optically active region 4.

Light emitted by the illuminant 2 enters the optically active region 4 via the light entry surface 4a, passes through the optically active region 4 and exits the optically active region 4 via the light emitting surface 4b. The optical device 3 comprises an adjustment means 5, which is configured to adjust operating states of the optical device 3, wherein at least two different operating states of the optical device 3 are provided.

In FIG. 1, the optical device is in a first operating state B1, wherein the optical device 3 forms a first light function with the light of the illuminant 2 as it passes through the optically active region 4a in the first operating state B1.

FIG. 2 shows a second operating state B2 of the optical device, in which the optical device 3 forms a second light function that is different from the first light function with the light of the illuminant 2 as it passes through the optically active region 3.

The illuminant 2 has a plurality of light sources 2a spaced apart from one another at a minimum distance, which are arranged in a light source surface 2b, preferably uniformly, distributed on a light source support 2c of the illuminant 2.

In the exemplary embodiment shown according to FIGS. 1 and 2, the illuminant 2 comprises seven vertically stacked light sources 2a spaced apart from one another, which form a vertical light source row, wherein several vertical light source rows are horizontally spaced apart from one another. With n vertical light source rows, the illuminant 2 thus comprises nx7 light sources 2a. The side views, FIGS. 1 and 2, respectively show the outermost vertical light source rows. Each light source 2a can emit a divergent light beam with an opening angle a, wherein the light beams spread along a main emission direction 6. Each light beam produces a luminous spot on the optically active region 4 of the optical device 3. The main emission direction 6 is oriented substantially parallel to the optical axis x of the optically active region 4.

In FIGS. 1 and 2, the top and bottom three light sources 2a (or their horizontal light source rows running in the sheet plane) are not switched on. The light sources that are switched on can be recognised by a marked schematic light beam.

FIGS. 1a and 2a respectively show a front view of the illumination device 1, wherein the plurality of light sources 2a can be recognized in FIG. 1 as the device is in the first operating state B1. FIG. 2a shows a front view of the illumination device 1 in the second operating state B2, wherein the individual light sources 2a can no longer be recognized. The overlap of the individual light cones or light beams present in comparison to the state B1 is indicated by overlapping dashed circles. All light sources 2a are respectively switched on in FIGS. 1a and 2a.

The optically active region 4 of the optical device 3 comprises scattering elements 7, which are configured to scatter the light of the light sources 2a around the main emission direction 6 when passing through the optically active region 4. The scattering elements 7 comprise, for example, a plurality of diffuser lenses arranged side by side in a, preferably uniform, grid, a plurality of scattering surface structures, or a plurality of scattering particles arranged within the optically active region 4.

The adjustment means 5 is configured to adjust the optical device 3 in such a way that in the first operating state B1, the optically active region 4 of the optical device 3 has a first normal distance L1 to the light source surface 2b and, in the second operating state B2, the optically active region 4 of the optical device 3 has a second normal distance L2 to the light source surface 2b. The first normal distance L1 is such that luminous spots of light beams from two adjacent light sources 2a are overlap-free on the light entry surface 4a of the optically active region 4 (FIG. 1). The second normal distance L2 is greater than the first normal distance L1 such that luminous spots of light beams from two adjacent light sources 2a at least partially overlap on the light entry surface 4a of the optically active region 4. The overlap of the luminous spots of adjacent light beams in the second operating state B2 is at least 25%, preferably more than 50%, in particular more than 75%.

The transition from the first normal distance L1 to the second normal distance L2 (between the main plane 4c of the optically active region 4 and the light source surface 2b of the illuminant 2) can be substantially continuously adjusted with the adjustment means 5. For this purpose, the adjustment means 5 moves the optically active region 4 substantially along the optical axis x of the optically active region 4.

The illumination device 1 further comprises a light source control device (not shown), which is configured to individually control the light sources 2a of the illuminant 2, wherein the light sources 2a are preferably LEDs.

As shown in FIGS. 1a and 2a, the light sources 2a are arranged distributed in a grid, wherein the light sources 2a are in particular arranged along rows and columns of a two-dimensional, preferably uniform, grid. The top and bottom light sources 2a are switched off in the example shown in FIG. 1, and the middle light sources are switched on, creating a luminous strip. In FIG. 1a, the operating state B1 is shown (wherein all light sources 2a are switched on in this example), wherein as a result of the smaller normal distance L1 between the light sources 2a and the optical device 3 (or the optically active region 4), the light sources 2a are clear. In FIG. 2a, the operating state B2 is shown, wherein as a result of the larger normal distance L2 between the light sources 2a and the optical device 3 (or the optically active region 4), the light sources 2a are blurred.

The light sources 2a of the illuminant 2 can be formed from at least two light source groups, wherein light sources of a first light source group are arranged in the light source surface 2b on the light source support 2c in a first, preferably uniform, grid with a first grid spacing from one another, wherein light sources of a second light source group are arranged in the light source surface 2b on the light source support 2c in a second, preferably uniform, grid with a second grid spacing from one another, wherein the first grid spacing is greater than the second grid spacing.

The optically active region 4 of the optical device 3 can also be formed from at least two optically active partial regions, wherein a first optically active partial region has a first number of scattering elements 7 and a second optically active partial region has a second number of scattering elements 7, wherein the first and second number of scattering elements 7 are different.

The illuminant 2 can be arranged relative to the optical device 3 in such a way that light of the first light source group strikes the first optically active partial region and light of the second light source group strikes the second optically active partial region.

The first light function can be an information transfer light function, by means of which a definable, predeterminable symbol, which is made up of individual illuminating light sources, can be displayed, wherein the second light function is preferably a brake light, a direction indicator light function, a daytime running light, a position light or a stop light.

The invention claimed is:

1. An illumination device (1) for a motor vehicle headlight or a motor vehicle, the illumination device comprising:
    an illuminant (2); and
    an optical device (3) associated with the illuminant (2), wherein the illuminant (2) is configured to generate light and emit the generated light onto the optical device (3), and the optical device (3) is configured to perform at least two different light functions from the light of the illuminant (2),
    wherein the optical device (3) has an optically active region (4), which has an optical axis (x) and a main plane (4c), wherein the optically active region (4) has a light entry surface (4a) and a light emitting surface (4b) opposite the light entry surface (4a), wherein light emitted by the illuminant (2) enters the optically active region (4) of the optical device (3) via the light entry surface (4a), passes through the optically active region (4) of the optical device (3) and exits the optically active region (4) of the optical device (3) via the light emitting surface (4b), wherein the optical device (3) has an adjustment means (5), which is configured to adjust operating states of the optical device (3), wherein at least two different operating states of the optical device (3) are provided,
    wherein in a first operating state (B1), the optical device forms a first light function with the light of the illuminant (2) as it passes through the optically active region (4a), and in a second operating state (B2), the optical device (3) forms a second light function that is different from the first light function with the light of the illuminant (2) as it passes through the optically active region (3),
    wherein the illuminant (2) comprises a plurality of light sources (2a) spaced apart from one another at a minimum distance, which are arranged in a light source surface (2b) distributed on a light source support (2c) of the illuminant (2), wherein each light source (2a) emits a divergent light beam with an opening angle (a), which spreads along a main emission direction (6), wherein each light beam forms a luminous spot on the optically active region (4) of the optical device (3),
    wherein the optically active region (4) of the optical device (3) has scattering elements (7), which are configured to scatter the light of the light sources (2a) around the main emission direction (6) when passing through the optically active region (4), and
    wherein the adjustment means (5) is configured to adjust the optical device (3) in such a way that in the first operating state (B1), the optically active region (4) of the optical device (3) has a first normal distance (L1) to the light source surface (2b) and, in the second operating state (B2), the optically active region (4) of the optical device (3) has a second normal distance (L2) to the light source surface (2b), wherein the first normal distance (L1) is such that luminous spots of light beams from two adjacent light sources (2a) are overlap-free on the optically active region (4), wherein the second normal distance (L2) is greater than the first normal distance (L1) such that luminous spots of light beams from two adjacent light sources (2a) at least partially overlap on the optically active region (4),
    wherein the illumination device is part of a motor vehicle head light.

2. The illumination device (1) according to claim 1, wherein the overlap of the luminous spots of adjacent light beams in the second operating state (B2) is at least 25%.

3. The illumination device (1) according to claim 1, wherein the main emission direction (6) is oriented substantially parallel to the optical axis (x) of the optically active region (4).

4. The illumination device (1) according to claim 1, wherein the optically active region (4) of the optical device (3) is flat, wherein the optical axis (x) of the optically active region (4) is oriented orthogonally to the main plane (4c) of the optically active region (4).

5. The illumination device (1) according to claim 1, wherein the scattering elements (7) comprise a plurality of diffuser lenses arranged side by side in a grid, a plurality of scattering surface structures, or a plurality of scattering particles arranged within the optically active region (4).

6. The illumination device (1) according to claim 1, wherein the transition from the first normal distance (L1) to the second normal distance (L2) between the main plane (4c) of the optically active region (4) of the optical device (3) and the light source surface (2b) of the illuminant (2) can be substantially continuously adjusted with the adjustment means (5).

7. The illumination device (1) according to claim 1, wherein the adjustment means (5) is configured to adjust a third operating state of the optical device (3) that is different from the first (B1) and second operating state (B2), wherein the adjustment means (5) carries out a displacement and/or pivotal movement of the optical device (3) relative to the light sources (2a) of the illuminant (2) during the transition to the third operating state, wherein during the displacement and/or pivotal movement, the optical device (3) is displaced and/or pivoted in such a way that in the third operating state, the optically active region (4) of the optical device (3) lies outside of a beam path of the light of the illuminant (2) such that in the third operating state, the optically active region (4) is substantially unlit.

8. The illumination device (1) according to claim 1, comprising a light source control device, which is configured to individually control the light sources (2a) of the illuminant (2), wherein the light sources (2a) are LEDs.

9. The illumination device (1) according to claim 1, wherein the light sources (2a) are arranged in the light source surface (2b) distributed on the light source support (2c) in a grid, wherein the light sources (2a) are in particular arranged along rows and columns of a two-dimensional grid.

10. The illumination device (1) according to claim 1, wherein the light source support (2c) is flat, wherein the light source surface (2b), which is in particular flat, is oriented substantially parallel to the light source support (2c).

11. The illumination device (1) according to claim 1, wherein the light sources (2a) of the illuminant (2) are formed from at least two light source groups, wherein light sources of a first light source group are arranged in the light source surface (2b) on the light source support (2c) in a first grid with a first grid spacing from one another, wherein light sources of a second light source group are arranged in the light source surface (2b) on the light source support (2c) in a second grid with a second grid spacing from one another, wherein the first grid spacing is greater than the second grid spacing.

12. The illumination device (1) according to claim 1, wherein the optically active region (4) of the optical device (3) is formed from at least two optically active partial regions, wherein a first optically active partial region has a first number of scattering elements and a second optically active partial region has a second number of scattering elements, wherein the first and second number of scattering elements are different.

13. The illumination device (1) according to claim 11, wherein the illuminant (2) is arranged relative to the optical device (3) in such a way that light of the first light source group strikes the first optically active partial region and light of the second light source group strikes the second optically active partial region.

14. The illumination device (1) according to claim 1, wherein the first light function is an information transfer light function, by means of which a definable, predeterminable symbol, which is made up of individual illuminating light sources, can be displayed, wherein the second light function is a brake light, a direction indicator light function, a daytime running light, a position light or a stop light.

15. A motor vehicle, comprising the illumination device (1) according to claim 1.

16. The illumination device (1) according to claim 1, wherein the plurality of light sources (2a) are arranged uniformly in the light source surface (2b).

17. The illumination device (1) according to claim 2, wherein the overlap of the luminous spots of adjacent light beams in the second operating state (B2) is more than 50%.

18. The illumination device (1) according to claim 2, wherein the overlap of the luminous spots of adjacent light beams in the second operating state (B2) is more than 75%.

19. The illumination device (1) according to claim 9, wherein the light sources (2a) are arranged along rows and columns of a uniform two-dimensional grid.

20. The illumination device (1) according to claim 11, wherein each of the first grid and the second grid is a uniform grid.

* * * * *